July 5, 1960

A. L. SOLOMON ET AL 2,944,200

FERROELECTRIC DEVICES

Filed Aug. 30, 1956

−110°C

−106°C

−104.5°C

INVENTORS:
ALLEN L. SOLOMON &
GEORGE J. GOLDSMITH
BY

ATTORNEY

United States Patent Office 2,944,200
Patented July 5, 1960

2,944,200
FERROELECTRIC DEVICES

Allen L. Solomon, Glen Cove, N.Y., and George J. Goldsmith, Princeton, N.J., assignors to Radio Corporation of America, a corporation of Delaware Filed Aug. 30, 1956, Ser. No. 607,075

3 Claims. (Cl. 317—262)

This invention relates to improved ferroelectric devices and particularly, but not necessarily exclusively, to improved ferroelectric devices including a body of thiourea or a crystallographic isomorph thereof as the active ferroelectric material.

A ferroelectric material is a material which displays a spontaneous polarization of electric dipoles that can be reversed by an attainable electric field. This is manifested by a ferroelectric hysteresis loop when the polarization of a crystal of the material is plotted against an applied electric field. Some previously known ferroelectrics are: Rochelle salt, potassium dihydrogen phosphate, barium titanate, and guanidine aluminum sulfate hexahydrate.

For commercial uses, the ferroelectric material should be easily prepared as discrete crystals, should require a low coercive electric field to reverse the spontaneous polarization, should have a high polarization, and should have a square hysteresis loop. No single previously known material possesses all of these desirable properties.

One object of the invention is to provide improved ferroelectric devices.

Another object is to provide improved ferroelectric devices useful for commercial purposes.

Thiourea and its crystallographic isomorphs, which are previously known compounds, have been found to possess the unusual and unexpected property of ferroelectricity. The ferroelectric properties occur parallel to the 010 crystallographic axis of crystals of these materials.

An improved device of the invention which uses the newly discovered ferroelectric properties includes a body of material selected from the group consisting of thiourea and crystallographic isomorphs thereof and means for applying an electric field to said body. A typical device comprises a crystal of thiourea spacing a pair of electrodes, said electrodes capable of producing a substantial electric field parallel to the 010 axis of said crystal when connected to a suitable source of voltage.

Figure 1:
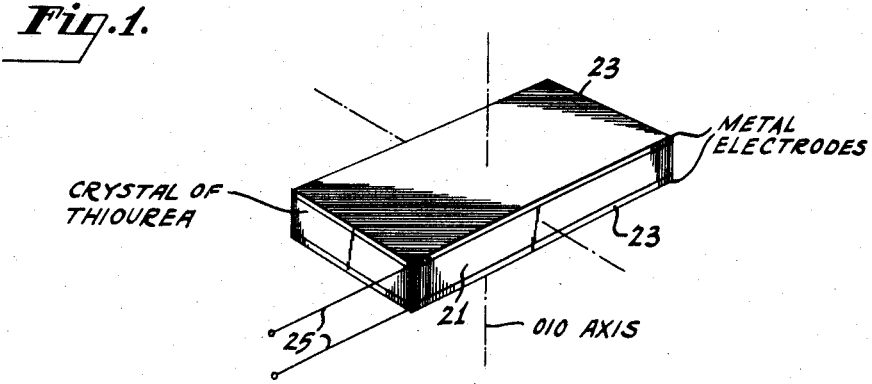
Figure 2A:
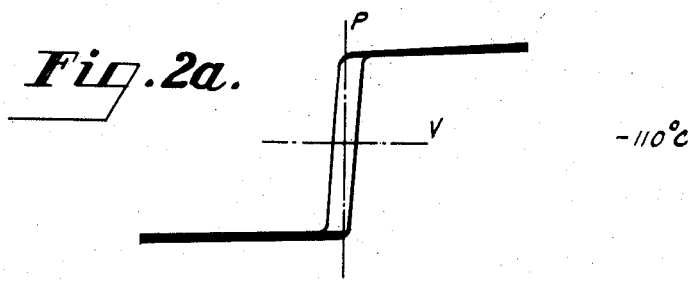
Figure 2B:
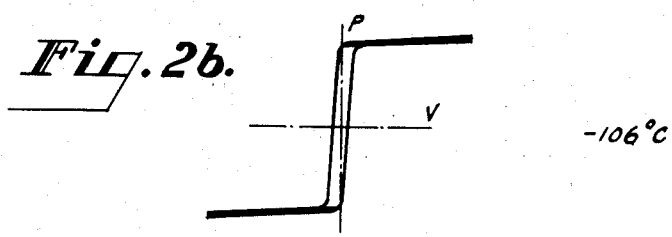
Figure 2C:
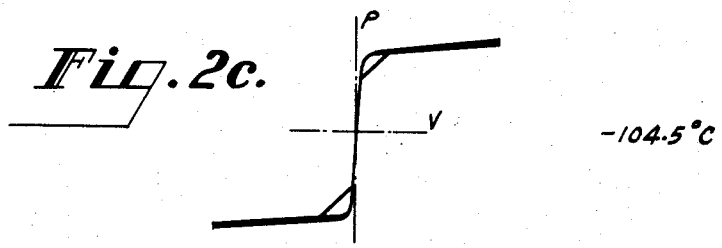

The invention is described in greater detail by reference to the accompanying drawings in which:

Figure 1 is an idealized crystal of thiourea with electrodes applied to opposite faces which lie in planes perpendicular to the 010 axis of the crystal, and Figures 2a, 2b, and 2c are a typical family of curves illustrating the ferroelectric hysteresis of the device of Figure 1 near the Curie temperature.

Example.—To prepare crystals of thiourea, slowly evaporate a quantity of a saturated solution of thiourea in methanol at about 30° C. in air with constant stirring of the solution. Upon evaporation of a portion of the methanol, crystals of orthorhombic thiourea crystallize as small clear prisms. The crystals are removed from the solution, dried, and are now ready for use in a ferroelectric device. Other methods of preparing thiourea may, of course, be used. As a matter of convenience, the crystals may be cleaved in a plane perpendicular to the 010 axis of the crystal to provide crystals of the desired thickness. Cleavage is not a necessary step in preparing the ferroelectric devices of the invention.

Referring to Figure 1, electrodes 23 are applied to opposite crystal faces which lie in the plane perpendicular to the 010 axis of one of the crystals 21 of thiourea. Electrodes are most conveniently prepared by applying a quantity of air drying silver paste upon the surfaces to be electroded. Such silver paste may comprise, for example, silver particles dispersed in a suitable binder such as cellulose nitrate. Another method for producing electrodes is to evaporate a noble metal, such as silver, in a vacuum upon the surfaces to be electroded. Other metals, such as gold, platinum, and indium, may be used as the electrode materials. It is preferable, but not necessary, to adherently attach the electrode material to the surfaces of the crystal. Optionally, the electrodes may be physically separate from the crystal and merely applied to the surface thereof. Electrodes which make good electrical contact uniformly to the crystal surface are preferred so that there is a negligible capacitance between the crystal 21 and the electrode 23. Lead wires 27 are attached to each of the electrodes 23. The electroded crystal is now ready for use as a ferroelectric device.

An electroded crystal about 0.5 mm. thick is cooled to about −110° C. and connected to a voltage source (not shown). Upon applying a 60 cycle A.C. peak voltage of about 30 volts, the device exhibits a remarkably square, symmetric ferroelectric hysteresis loop. Referring to Figure 2a there is shown the ferroelectric hysteresis loop of the electroded crystal of Figure 1 at about −110° C. The ordinate represents the spontaneous polarization P in microcoulombs/cm.$^2$ and the abscissa represents the applied field V in volts. In Figure 2a the spontaneous polarization is about 3 microcoulombs/cm.$^2$ and the coercive voltage is about 20 volts. This corresponds to a coercive field of about 400 volts/cm. Figures 2b and 2c illustrate similar data at about −106° C. and −104.5° C. respectively. The Curie temperature of thiourea is believed to be about −104.8° C.

Thiourea is representative of a new class of ferroelectric materials not previously known. Whereas all previously known ferroelectric materials contained oxygen, thiourea does not contain oxygen. All of the materials in the same chemical family as and crystallographically isomorphic with thiourea exhibit ferroelectric properties. Such isomorphs may be obtained by elemental or radical substitution in thiourea. Examples of substitutions which frequently give isomorphs are: partial or complete isotropic substitutions such as deuterium for hydrogen, elemental substitutions such as selenium or tellurium for sulfur, substitutions by monovalent radicals such as —CH$_3$ or —NH$_2$ for hydrogen, radical substitution such as PH$_2$ for for —NH$_2$. The general class includes isomorphs of thiourea having the formula:

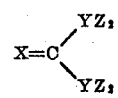

Wherein:

X may be sulfur, selenium, tellurium or combinations thereof,

Y may be nitrogen, phosphorus, or combinations thereof,

Z may be monovalent radical or element such as hydrogen, deuterium, methyl, amine, halogen or combinations thereof.

Referring to the Table, there is listed thiourea and representatives of previously known classes of ferroelectric materials. There is also listed some physical and ferroelectric properties of each of these materials. It will be noted that thiourea has a desirable balance of high polarization, and low coercive field.

TABLE
*Properties of representatives of the known classes of ferroelectrics*

| Substance | Formula | Crystal Structure [1] | $P_s$ | $T_c$, degrees | $E'_{t_0}$ | $E_c$ |
|---|---|---|---|---|---|---|
| Thiourea | $SC(NH_2)_2$ | orthorhombic | 3.2 | 169.2 | 100 | 300 |
| Barium titanate | $BaTiO_3$ | tetragonal | 26 | 393 | 160 | 500 |
| Rochelle salt | $KNaC_4H_4O_6 \cdot 4H_2O$ | monoclinic | 0.24 | [2] 297, 255 | 4,000 | 1,000 |
| Potassium dihydrogen phosphate | $KH_2PO_4$ | tegragonal | 4.95 | 123 | 21 | 1,000 |
| Guanidine aluminum sulfate | $C(NH_2)_3 Al(SO_4)_2 \cdot 6H_2O$ | trigonal | 0.35 | >373 | 6 | 3,000 |
| Methyl-ammonium aluminum alum | $(CH_3NH_3) Al(SO_4)_2 \cdot 12H_2O$ | cubic | 0.6 | 176 | 9 | 5,000 |
| Ammonium sulfate | $(NH_4)_2SO_4$ | orthorhombic | 0.25 | 223.5 | | |
| Ammonium cadmium sulfate | $(NH_4)_2(Cd)_2(SO_4)_3$ | cubic | 0.3 | 103 | 9 | |

[1] Crystal structure 293° K.
[2] Rochelle salt has two Curie temperatures between which it is ferroelectric.
$P_s$—maximum spontaneous polarization in microcoulombs/cm.$^2$
$T_c$—Curie tempersture in degrees Kelvin.
$E'_{t_0}$—small signal dielectric constant at about 300° K. along ferroelectric axis.
$E_c$—estimated coercive field at 60 cycles in volts/cm.

The ferroelectric devices of the invention are useful in various applications, for example, in conjunction with electroluminescent systems, computers, electronic memory devices and binary switches. Such ferroelectric devices are discussed in more complete detail in H. Sachse, Ferroelektrica, Springer-Varlag OHG, Berlin, Germany, 1956, pgs. 144 to 156.

There have been described improved ferroelectric devices including a body of thiourea or a crystallographic isomorph thereof.

What is claimed is:

1. A ferroelectric device comprising a crystal of a material crystallographically isomorphic with thiourea and selected from the group consisting of compounds having the formula:

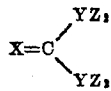

wherein:

X may be sulfur, selenium, telliurium, or combinations therof,

Y may be nitrogen, phosphorus or combinations thereof, and

Z may be hydrogen, deuterium, methyl, amine or combinations thereof, and means for applying an electric field having a substantial component parallel to the 010 axis of said crystal.

2. A ferroelectric device comprising a crystal of thiourea and means for applying an electric field having a substantial component parallel to the 010 axis of said crystal.

3. A ferroelectric device comprising a crystal of thiourea spacing a pair of electrodes, said electrodes capable of producing a substantial electric field parallel to the 010 axis of said crystal.

References Cited in the file of this patent

UNITED STATES PATENTS

| | | |
|---|---|---|
| 2,538,554 | Cherry | Jan. 16, 1951 |
| 2,695,398 | Anderson | Nov. 23, 1954 |
| 2,706,326 | Mason | Apr. 19, 1955 |